US009501082B2

(12) United States Patent
Anspaugh et al.

(10) Patent No.: US 9,501,082 B2
(45) Date of Patent: Nov. 22, 2016

(54) RAKE-LEVER DAMPENER OF STEERING COLUMN

(71) Applicant: Steering Solutions IP Holding Corporation, Saginaw, MI (US)

(72) Inventors: Michael P. Anspaugh, Bay City, MI (US); Donald A. Buzzard, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 72 days.

(21) Appl. No.: 14/501,740

(22) Filed: Sep. 30, 2014

(65) Prior Publication Data

US 2015/0090068 A1    Apr. 2, 2015

Related U.S. Application Data (60) Provisional application No. 61/885,793, filed on Oct. 2, 2013.

(51) Int. Cl.
| B62D 1/18 | (2006.01) |
| G05G 1/04 | (2006.01) |
| B62D 1/187 | (2006.01) |
| B62D 1/184 | (2006.01) |

(52) U.S. Cl.
CPC ............... G05G 1/04 (2013.01); B62D 1/184 (2013.01); B62D 1/187 (2013.01); Y10T 74/2063 (2015.01)

(58) Field of Classification Search
CPC ....... B62D 1/189; B62D 1/184; B62D 1/187

USPC .............................. 280/775, 779; 74/492, 493
See application file for complete search history.

(56) References Cited

U.S. PATENT DOCUMENTS

| 4,538,477 | A | * | 9/1985 | Kurusu | ............... | B62D 1/183 |
| | | | | | | 280/775 |
| 4,538,478 | A | * | 9/1985 | Sato | ............... | B62D 1/183 |
| | | | | | | 280/775 |
| 5,025,679 | A | * | 6/1991 | Yamamoto | ............... | B62D 1/184 |
| | | | | | | 280/775 |
| 5,213,004 | A | * | 5/1993 | Hoblingre | ............... | B62D 1/184 |
| | | | | | | 403/92 |
| 7,635,149 | B2 | * | 12/2009 | Menjak | ............... | B62D 1/184 |
| | | | | | | 280/775 |
| 2002/0084644 | A1 | * | 7/2002 | Rinker | ............... | B62D 1/184 |
| | | | | | | 280/775 |
| 2005/0178231 | A1 | * | 8/2005 | Schick | ............... | B62D 1/184 |
| | | | | | | 74/493 |
| 2008/0060467 | A1 | * | 3/2008 | Manwaring | ............... | B62D 1/184 |
| | | | | | | 74/493 |
| 2008/0202276 | A1 | * | 8/2008 | Harris | ............... | B62D 1/187 |
| | | | | | | 74/493 |
| 2009/0250916 | A1 | * | 10/2009 | Olgren | ............... | B62D 1/184 |
| | | | | | | 280/775 |

\* cited by examiner

Primary Examiner — Toan To
(74) Attorney, Agent, or Firm — Cantor Colburn LLP (57) ABSTRACT

A dampener assembly for a lever is provided. The dampener assembly includes a travel limiter that defines a surface for co-acting with the dampener. The lever is configured to move from a locked position to an unlocked position to unlock a component for adjustable movement. The dampener assembly includes also a roller bumper and cam assembly that is configured to cause the surface of the travel limiter to contact the roller bumper in the unlocked position. In an exemplary embodiment, the component is a rake-telescope steering column or an adjustment assembly therefor.

15 Claims, 8 Drawing Sheets

RAKE-LEVER DAMPENER OF STEERING COLUMN

CROSS-REFERENCE TO RELATED APPLICATION

This application is based upon and claims benefit of the filing date of U.S. Patent Application 61/885,793 filed on Oct. 2, 2013 and entitled "Rake-Lever Dampener of Steering Column," which is incorporated herein by reference in its entirety.

FIELD OF INVENTION

The invention relates to unlocking and adjustment of a manual rake-telescope steering column and, in particular, a dampener for dampening rotational speed and/or noise when the steering column is unlocked or locked.

BACKGROUND OF INVENTION

In a typical configuration for a manual rake-telescope steering column, a lever is employed to lock the steering column or unlock it so that the steering column may be adjusted. In some systems, while the lever locks or unlocks the steering column, excess rotational speed and/or objectionable noise may be present as the lever stops abruptly, particularly when the lever travels toward an unlocked position.

Accordingly, it is desirable to provide a dampener of a lever of a manual rake-telescope steering column that addresses these concerns with excess rotational speed and objectionable noise.

SUMMARY OF INVENTION

In accordance with an exemplary embodiment of the invention, a dampener assembly for a lever is provided. The dampener assembly includes a travel limiter that defines a surface for co-acting with the dampener. The lever is configured to move from a locked position to an unlocked position to unlock a component for adjustable movement. The dampener assembly includes also a roller bumper and cam assembly that is configured to cause the surface of the travel limiter to contact the roller bumper in the unlocked position. In an exemplary embodiment, the component is a rake-telescope steering column or an adjustment assembly therefor.

While the lever unlocks the adjustment assembly, the dampener dampens excess rotational speed and/or objectionable noise that may be present as the lever stopped abruptly upon engagement of the unlocked position.

BRIEF DESCRIPTION OF EACH FIGURE OF DRAWING

The subject matter that is regarded as the invention is particularly pointed out and distinctly claimed in the claims at the conclusion of this specification. The foregoing and other features and advantages of the invention are apparent from the following detailed description of exemplary embodiments of the invention taken in conjunction with the accompanying drawing thereof in which:

DETAILED DESCRIPTION OF EMBODIMENTS OF INVENTION

Figure 1A:
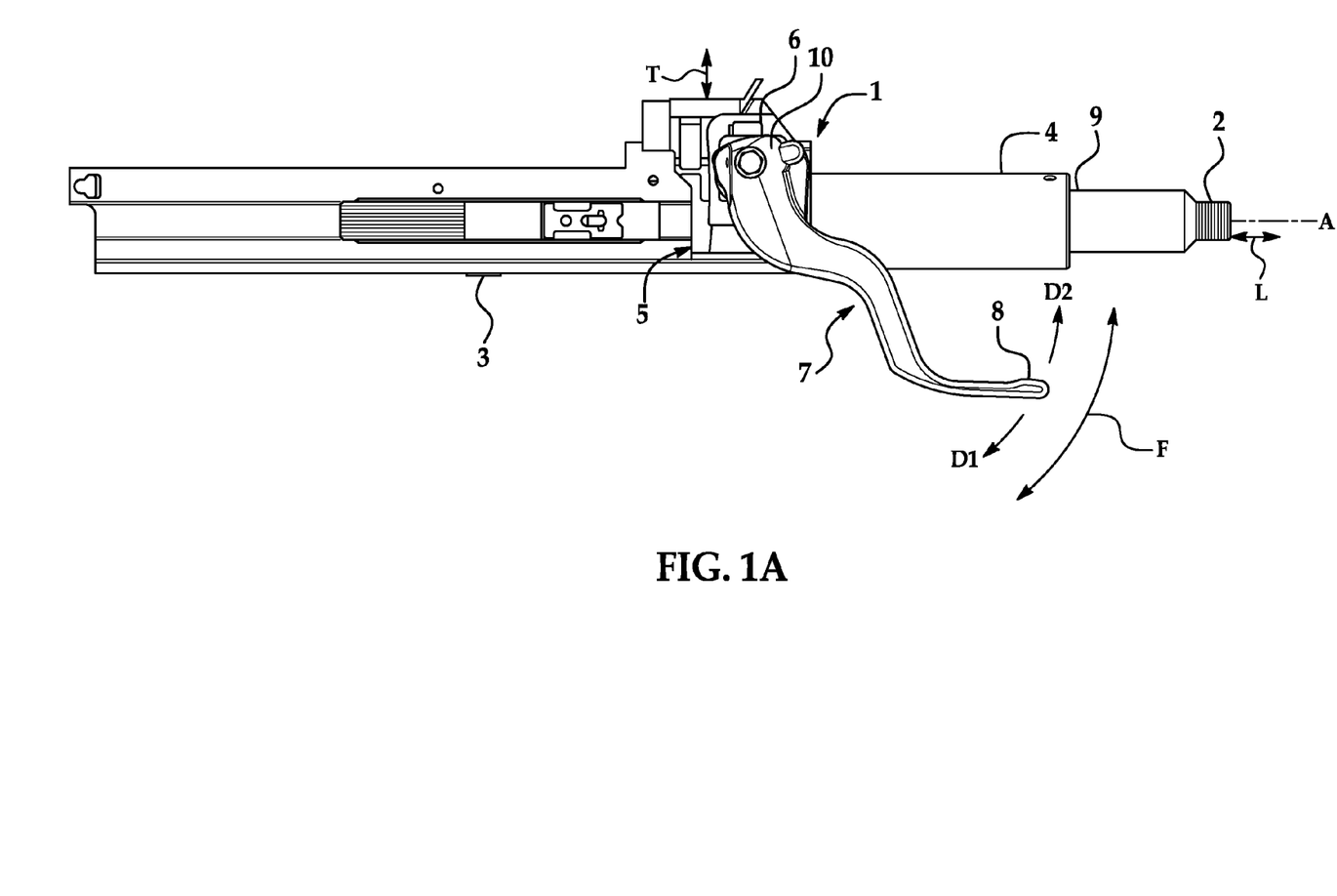
FIG. 1A is a side view of an exemplary embodiment of an adjustment assembly in a rake-telescope steering column according to the invention.
Figure 1B:
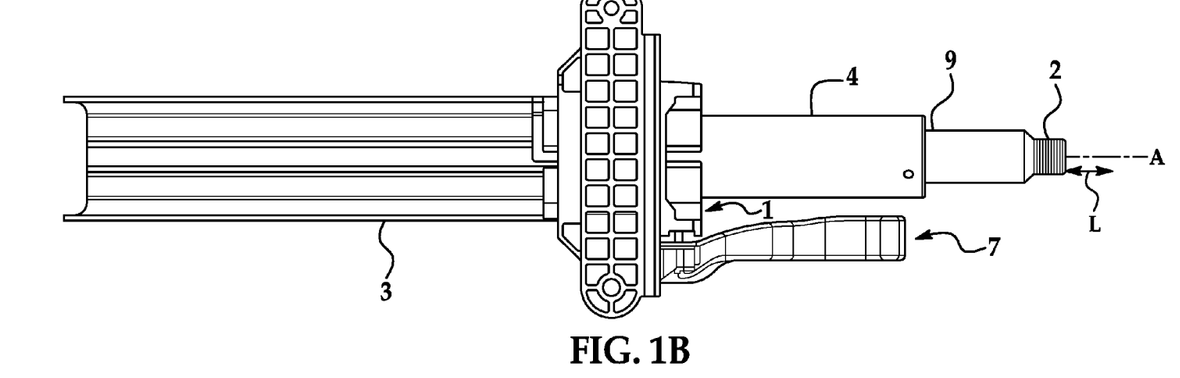
FIG. 1B is a bottom view of the adjustment assembly shown in FIG. 1.
Figure 1C:
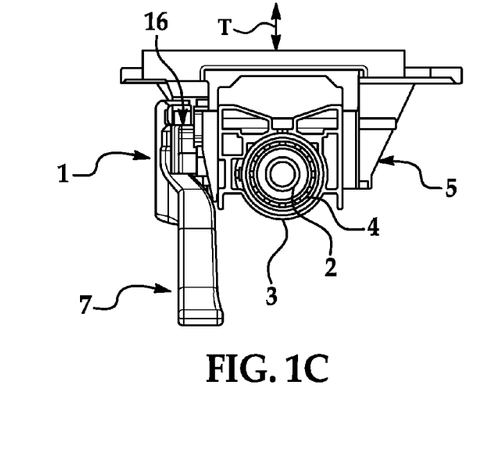
FIG. 1C is a front view of the adjustment assembly shown in FIG. 1.
Figure 2:
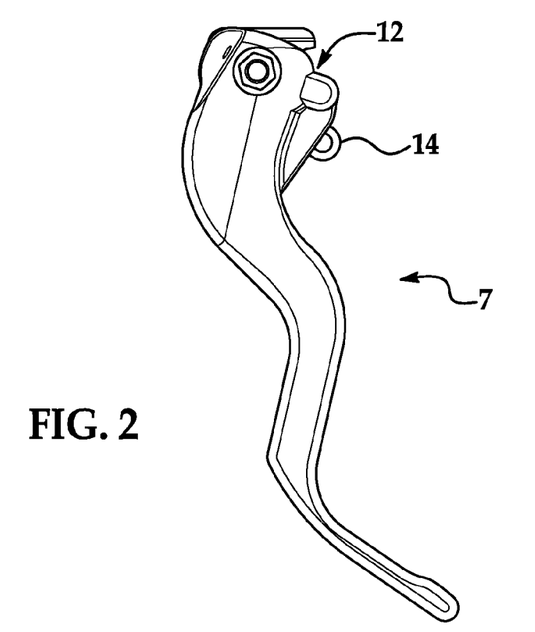
FIG. 2 is a front-side view of an exemplary embodiment of a dampener of a lever of the adjustment assembly shown in FIG. 1.

Referring now to the Figures, the invention will be described with reference to specific exemplary embodiments without limiting same. FIGS. 1A-1C illustrate an example of an adjustment assembly 1 operable to lock a component 2 of a vehicle (not shown) against adjustment of the component 2 or unlock the component 2 to allow adjustment thereof. In an exemplary embodiment, the component 2 is a steering column 2. For purposes of illustration, in an aspect of the embodiment, the component 2 is a rake-telescope steering column 2. However, it should be appreciated that the adjustment assembly 1 may be used in conjunction with other components—for example, an adjustable seat, a hood release, or a parking-brake release. The adjustment assembly 1 includes, among other structure, a lower jacket 3, an upper jacket 4 (FIGS. 1A and 1B), a rake bracket 5 defining a rake-adjustment slot 6 (FIG. 1A), and a linearly slidable actuating lever 7.

The steering column 2 extends in a longitudinal direction and defines a longitudinal axis A (FIGS. 1A and 1B). One end of the steering column 2 is connected to a steering wheel (not shown) to be operated by a user of the actuating lever 7 to steer the vehicle. Another end of the steering column 2 is fixed to a steering gear, rack, or mechanism (not shown) to transfer a rotational motion applied by the user on the steering wheel to the steering mechanism. The steering column 2 also includes an upper shaft 9 connected to a lower shaft (not shown) that, in turn, is connected to an intermediate shaft assembly (not shown), which is attached to the steering mechanism. The steering column 2 is adjustable in a rake or tilt direction T (FIGS. 1A and 1C) and telescoping or longitudinal direction L (i.e., along the axis A) (FIGS. 1A and 1B) such that a position (both rake and tilt aspects thereof) of the steering column 2 may be adjusted to one desired by the user.

The actuating lever 7 defines a first end 8 that extends outwardly (i.e., toward a rear of the vehicle) and is configured to be gripped or otherwise manipulated by the user. The user may selectively apply a force F (FIG. 1A) to move the actuating lever 7 along a path of travel defined in an imaginary plane that is generally parallel with the axis A, as indicated by direction arrows D1, D2 (FIG. 1A). However, it should be appreciated that the travel path may be defined in an imaginary plane that is other than generally parallel with the axis A. The actuating lever 7 defines further a second end 10 that extends inwardly (i.e., toward a front of the vehicle) relative to the first end 8 and is configured to engage another part of the adjustment assembly 1.

Figure 6:
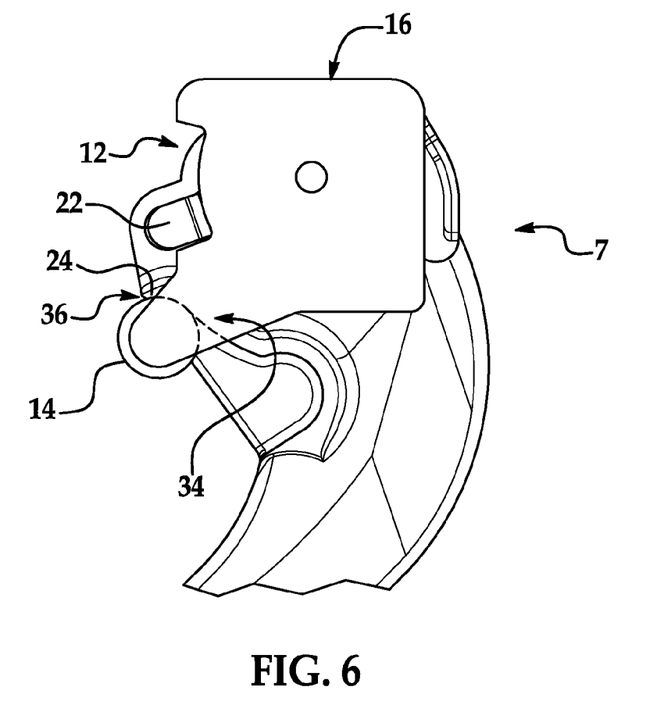
FIG. 6 is a partial rear-side view of the lever illustrated in FIG. 3 showing the roller bumper and the lever in a fully unlocked position.
Figure 7:
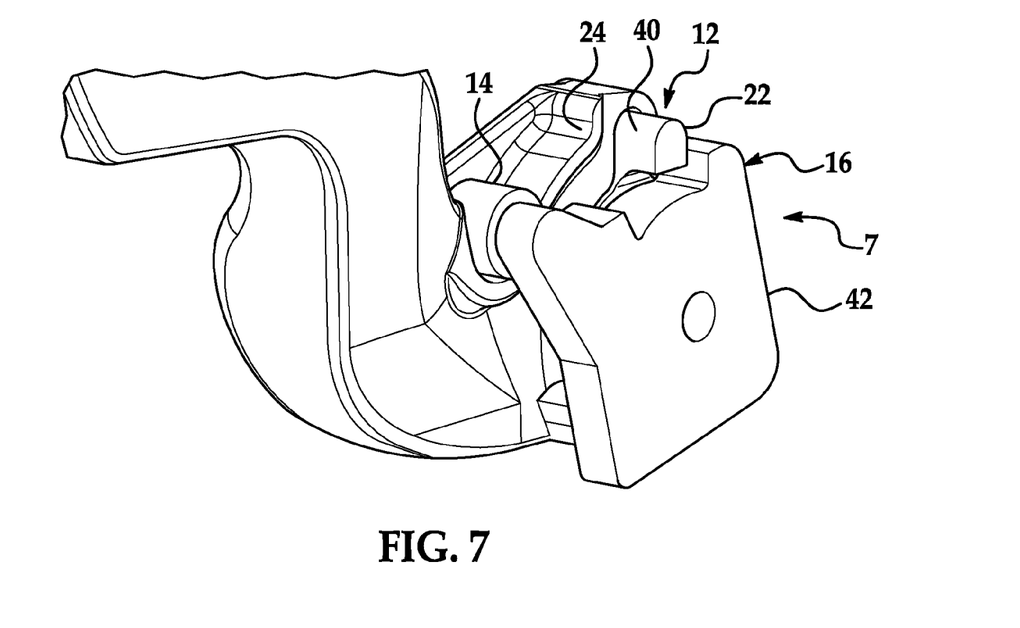
FIG. 7 is a partial perspective view of the lever illustrated in FIG. 2 showing the roller bumper in a locked position.
Figure 8:
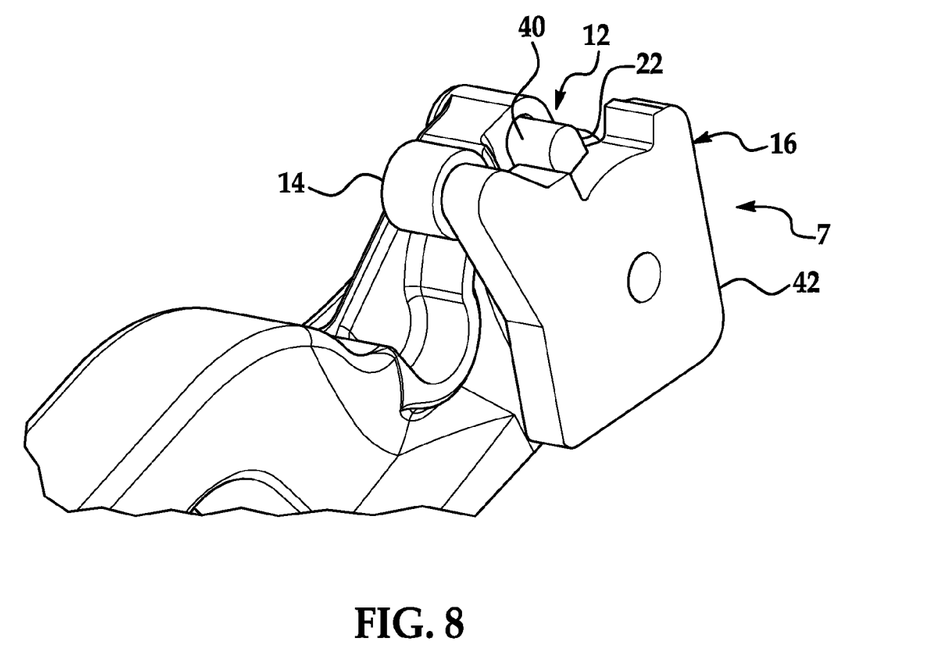
FIG. 8 is the partial perspective view of the lever of FIG. 7 showing the roller bumper in an unlocked position.
Figure 9:
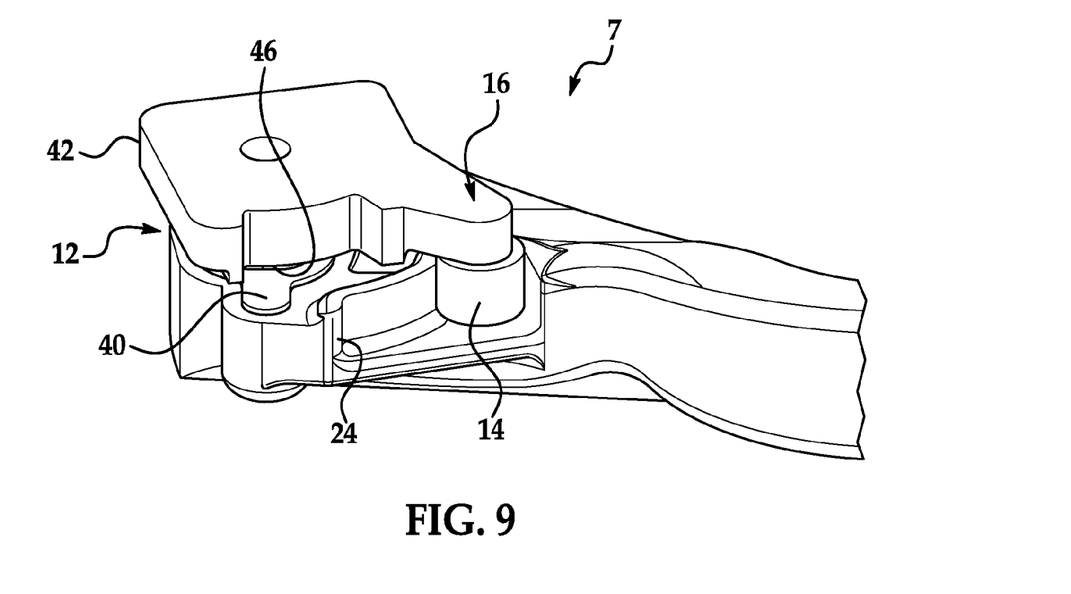
FIG. 9 is another embodiment similar to the partial perspective view of the lever illustrated in FIG. 2 showing the roller bumper in the locked position.
Figure 10:
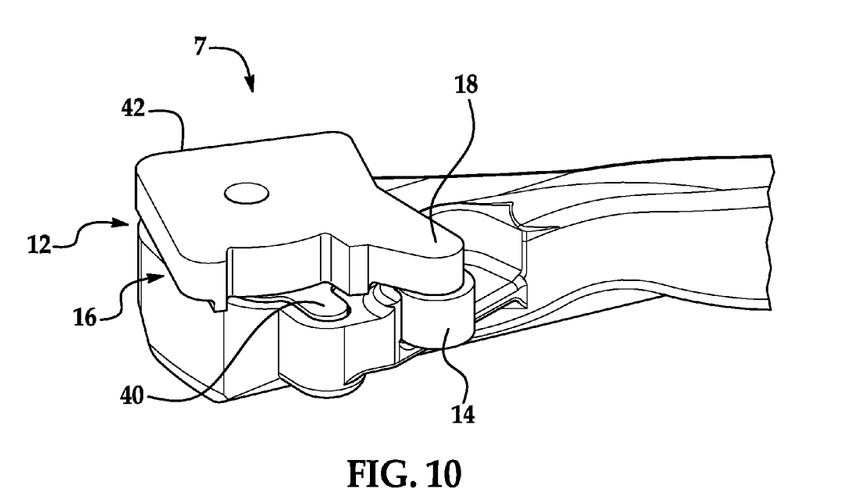
FIG. 10 is a partial perspective view of the lever of FIG. 9 showing the roller bumper in the unlocked position.

The actuating lever 7 is slidable by the user in a rotatable direction in a push-pull fashion between a first position where the adjustment assembly 1 is fully locked (FIG. 3) and second position where the adjustment assembly 1 is fully unlocked (FIG. 6). Movement of the actuating lever 7 may be along the travel path between the first and second positions. When the actuating lever 7 is moved in direction D2 to the first position, the adjustment assembly 1 is locked and may lock the steering column 2 in the desired position. When the adjustment assembly 1 is in a locked state, adjustment of the steering column 2 is limited or prevented, both in the tilt and longitudinal directions T, L. When the actuating lever 7 is moved in direction D1 to the second position, the adjustment assembly 1 is unlocked, and, thus, adjustment of the steering column 2 in the tilt and longitudinal directions T, L is allowed. With the adjustment assembly 1 in the unlocked state and the actuating lever 7 in the second position, the actuating lever 7 may be moved in opposite direction D2 to return the actuating lever 7 to the first position where the adjustment assembly 1 is locked.

Unlocking of the adjustment assembly 1 is achieved through an outward sliding movement of the actuating lever 7 in direction D1. Locking of the adjustment assembly 1 is achieved by sliding the actuating lever 7 inward in direction D2. However, this arrangement is shown for purposes of example only and non-limiting. Alternatively, the adjustment assembly 1 may be configured such that an inward movement of the actuating lever 7 in direction D2 unlocks the adjustment assembly 1 and allows for adjustment of the steering column 2 and an outward movement in direction D1 locks the adjustment assembly 1 and prevents or limits adjustment of the steering column 2.

The actuating lever 7 is configured to slide relative to other structure of the adjustment assembly 1. Toward that end, the actuating lever 7 may be slidingly attached to the other structure along the second end 10 of the actuating lever 7. Alternatively, an intermediate part may be positioned between the actuating lever 7 and other structure.

The actuating lever 7 may slide along the other structure of the adjustment assembly 1 in directions D1, D2, thereby slidingly attaching the actuating lever 7 to the other structure for movement relative thereto. The attachment allows movement of the actuating lever 7 relative to the other structure while substantially fixing the actuating lever 7 against movement in other directions.

It should be appreciated that the actuating lever 7 may be attached by any suitable arrangement that allows relative movement between the actuating lever 7 and other structure of the adjustment assembly 1. For example, an interlocking dovetail arrangement may be provided between the actuating lever 7 and the other structure. Alternatively, a projection having a generally circular cross-section extending in the longitudinal direction L can be received in a groove shaped to receive the projection. In addition, the attachment may be made at any suitable position along the actuating lever 7. Further still, a bearing element, such as a rolling element or rolling elements, may be disposed between the actuating lever 7 and other structure of the adjustment assembly 1.

The rake bracket 5 is fastened to surrounding structure— for example, the vehicle in which the steering column 2 is mounted—and supports the actuating lever 7, other structure of the adjustment assembly 1, and steering column 2. The rake-adjustment slot 6 is generally vertical or arcuate and allows for movement of the steering column 2 in the tilt direction T (relative to the rake bracket 5) and longitudinal direction L when the adjustment assembly 1 is unlocked. More specifically, a rake-adjustment shaft (not shown) extends through and is movable in the rake-adjustment slot 6 to adjust the position of the steering column 2 when the adjustment assembly 1 is unlocked.

Figure 11:
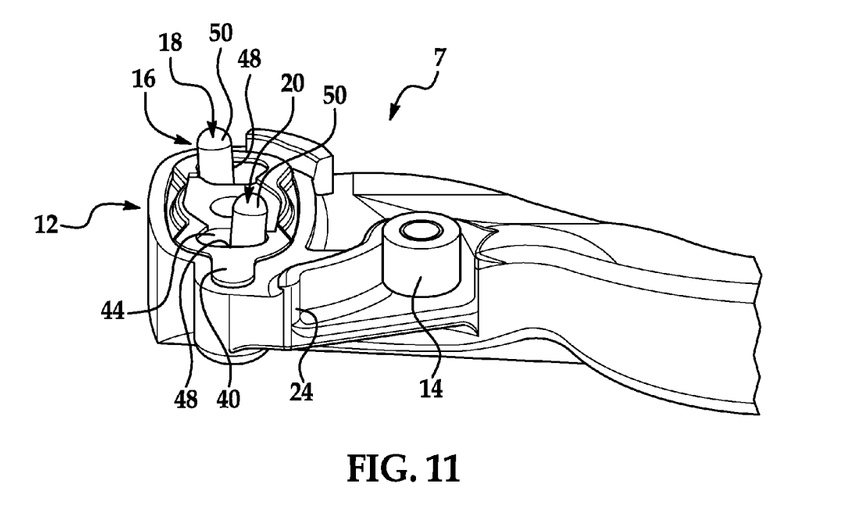
FIG. 11 is a partial perspective view with a portion of a cam assembly removed showing the roller bumper at the locked position.
Figure 12:
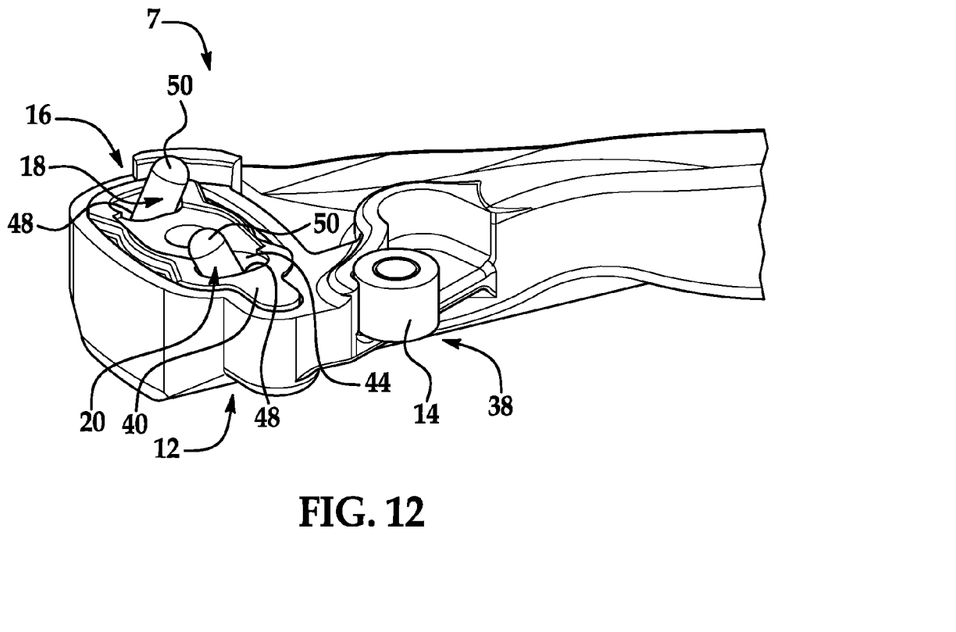
FIG. 12 is the partial perspective view of FIG. 11 with the portion of the cam assembly removed showing the roller bumper at the unlocked position.

Referring to FIGS. 2-12, in an exemplary embodiment, the actuating lever 7 includes a decelerator or dampener 12 that, in turn, includes a roller bumper 14 and clamping assembly 16 (FIGS. 3-12). In an aspect of the embodiment, the clamping assembly 16 is a cam assembly 16—in particular, a pin-type cam assembly 16. As such, the cam assembly 16 includes at least one pin 18, 20 (FIGS. 11 and 12). In the illustrated aspect, the cam assembly 16 is a two-pin cam assembly 16. However, it should be appreciated that other suitable cam assemblies may be implemented as well (for example, a three-pin cam assembly). The clamping assembly 16 is supported by the rake bracket 5.

As the actuating lever 7 is moved from the fully locked position (FIG. 3) to the fully unlocked position (FIG. 6), the cam assembly 16 compresses the roller bumper 14, which, in turn, slows rotation of the actuating lever 7 as the cam assembly 16 propels the actuating lever 7 toward the unlocked position. A travel limiter 22 (FIGS. 3-8) limits travel of the cam assembly 16. As the actuating lever 7 reaches the unlocked position, the roller bumper 14 contacts a profile or stop 24 on the actuating lever 7.

Before the actuating lever 7 is described in greater detail, the fully locked and fully unlocked positions (and positions therebetween) of the actuating lever 7, in general, and various compression states of the roller bumper 14, in particular, are now briefly described with reference to the Figures.

Figure 3:
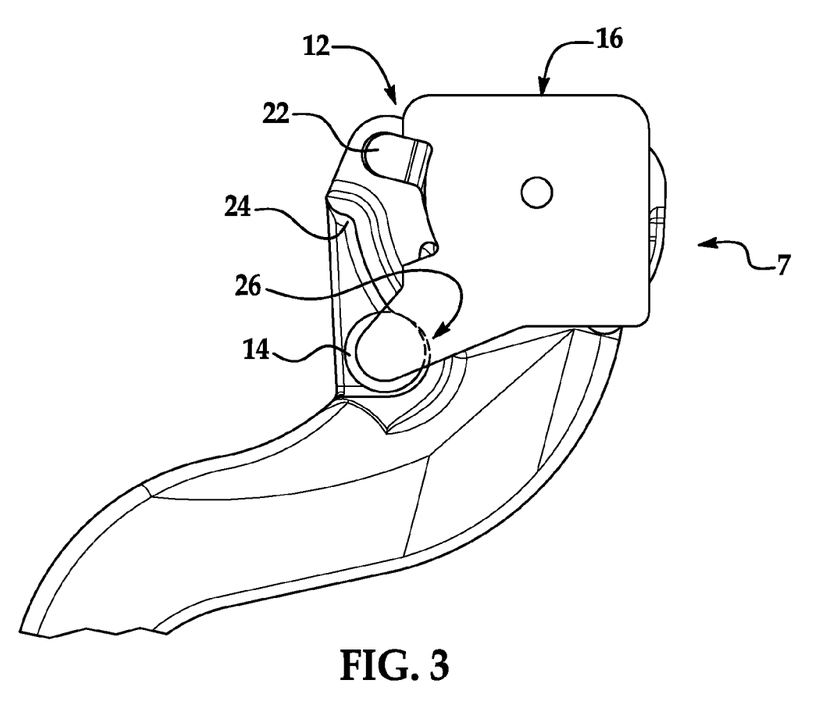
FIG. 3 is a partial rear-side view of the lever illustrated in FIG. 2 showing an exemplary embodiment of a roller bumper of the dampener according to the invention and the lever in a fully locked position.

Referring specifically to FIG. 3, as generally indicated at 26, the roller bumper 14 is shown in an uncompressed state at the fully locked position of the actuating lever 7.

Figure 4:
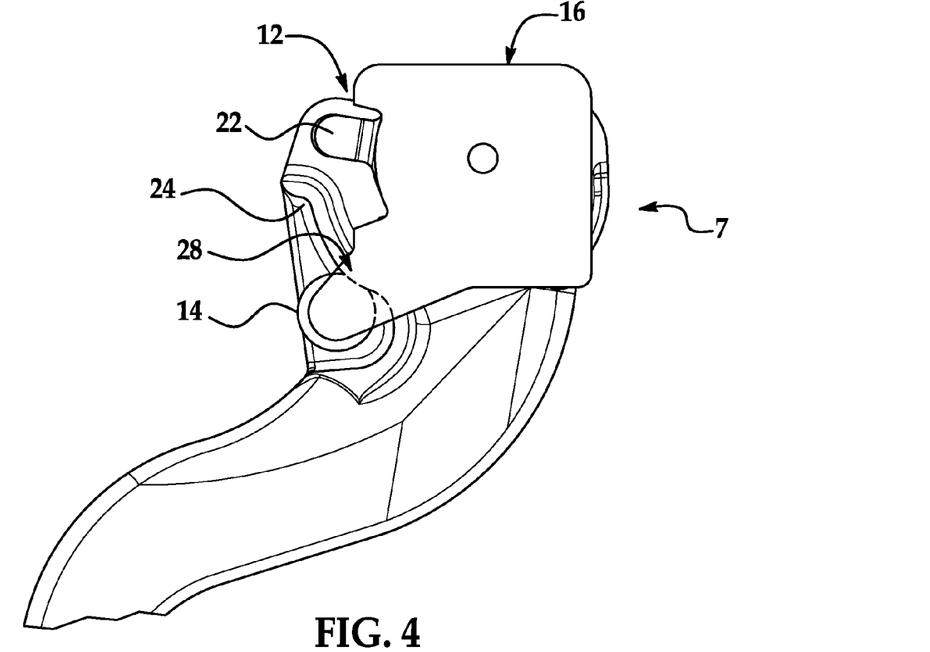
FIG. 4 is a partial rear-side view of the lever illustrated in FIG. 3 showing the roller bumper and the lever advancing toward an unlocked position.

Referring specifically to FIG. 4, as generally indicated at 28, the roller bumper 14 is shown in a fully compressed state while the actuating lever 7 advances toward the unlocked position (FIG. 6).

Figure 5:
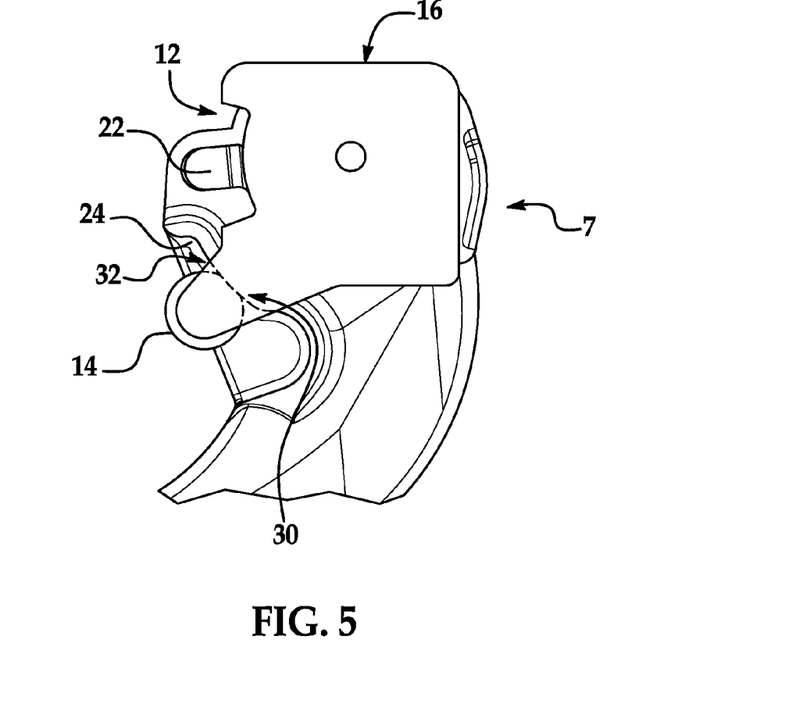
FIG. 5 is a partial rear-side view of the lever illustrated in FIG. 3 showing the roller bumper and the lever further advancing toward the unlocked position.

Referring specifically to FIG. 5, as generally indicated at 30, compression of the roller bumper 14 is shown being reduced while the actuating lever 7 further advances toward the unlocked position (FIG. 6). As generally indicated at 32, the roller bumper 14 is allowed to gradually decompress as the actuating lever 7 moves toward the unlocked position.

Referring specifically to FIG. 6, as generally indicated at 34, the roller bumper 14 is shown in a slightly compressed state at a fully unlocked position of the actuating lever 7. The roller bumper 14 is shown engaging the stop 24 at 36.

Referring specifically to FIGS. 7-10, the roller bumper 14 is shown respectively at the locked, unlocked, locked, and unlocked positions of the actuating lever 7.

Specifically, the embodiment of FIGS. 9-12 is similar to that of FIGS. 2-8 without the travel limiter 22.

Referring specifically to FIGS. 11-12, the roller bumper 14 is shown respectively at the locked position and, as generally indicated at 38, the unlocked position of the actuating lever 7.

As shown in FIGS. 7-12, the cam assembly 16 includes a left-hand inner cam or first cam plate 40 and second cam plate 42 (FIGS. 7-10). As shown in FIGS. 11 and 12, each of the pins 18, 20 is movably positioned in recesses 44, 46 (the latter shown in FIG. 9) defined respectively in the first and second cam plates 40, 42. The pin 18, 20 defines a first end 48 received in recess 44 of the first cam plate 40 and second end 50 received in recess 46 of the second cam plate 42. The ends 48, 50 of the pin 18, 20 may selectively slide about in the respective recesses 44, 46.

As the user selectively exerts the force on the actuating lever 7 to slide the actuating lever 7 in either direction D1, D2, the first cam plate 40 is caused to rotate while the second cam plate 42 remains rotationally fixed. The rotation of the first cam plate 40 causes the second end 50 of the pin 18, 20 to slide within recess 46.

Depending on direction of the rotation of the first cam plate 40, the pin 18, 20 moves generally vertically, pushing the second cam plate 42, which is fixed against rotation, axially inward. That is, as the pin 18, 20 is moved, the pin 18, 20 acts to push the second cam plate 42 in an axial direction inward toward the steering column 2. This push of the second cam plate 42 applies a clamping force to the rake bracket 5 and other structure of the adjustment assembly 1, which, in turn, clamps or locks the steering column 2 in the desired position.

Conversely, the rotation of the first cam plate 40 in an opposite direction, such that the pin 18, 20 moves away, allows the second cam plate 42 to move axially toward the first cam plate 40. This movement releases the clamping force applied to the steering column 2 and structure of the adjustment assembly 1, thereby unlocking and allowing adjustment of the steering column 2.

As generally indicated at 32 in FIG. 5, a combination of the cam assembly 16 and stop 24 is shown allowing the roller bumper 14 to gradually decompress as the actuating lever 7 moves toward the unlocked position.

As the actuating lever 7 reaches the unlocked position, the roller bumper 14 may contact the stop 24 on the actuating lever 7. As generally indicated at 36 in FIG. 6, the roller bumper 14 is shown engaging the stop 24. Alternatively, the roller bumper 14 may not contact the stop 24, causing the roller bumper 14 to continue rotation. If rotation continues, at this point, the cam assembly 16 begins to engage. In particular, each of the pins 18, 20 contacts a surface of the cam assembly 16 defined by the corresponding recess 44, 46, allowing the pin 18, 20 to rotate about the contact surface. The pin contact positions the actuating lever 7 in a normal unlocked position.

However, with an overload or excessive (above-normal) unlock rotational speed, the pin contact allows a slight over-travel motion. The over-travel motion begins to re-clamp the steering column 2, which decelerates the actuating lever 7 less abruptly and softens the unlocked engagement of the actuating lever 7. In particular, the surface of the cam assembly 26 defined by the corresponding recess 44, 46 is spherical and the end 48, 50 of the corresponding pin 18, 20 is spherical such that interaction between the cam assembly 16 and pin 18, 20 allows for the over-travel motion, which, in turn, provides the actuating lever 7 a soft stop. In this way, while the actuating lever 7 unlocks the steering column 2, the dampener 12 dampens excess rotational speed and/or objectionable noise that would otherwise be present as the actuating lever 7 stopped abruptly if the unlocked position were engaged.

In FIGS. 11-12, a portion of the cam assembly 16 is shown removed. As already described above, each of the pins 18, 20 is configured to be engaged with the respective surface of the cam assembly 16 to stop the actuating lever 7 from rotating. Again, the surface of the cam assembly 16 is spherical, and the end 48, 50 of the corresponding pin 18, 20 is spherical such that interaction between the cam assembly 16 and pin 18, 20 allows for slight over-travel of the actuating lever 7, which, in turn, provides the actuating lever 7 a soft stop. This soft stop dampens excess rotational speed and/or objectionable noise that may be present as the actuating lever 7 stopped abruptly if an unlocked position were engaged.

In an aspect of the exemplary embodiment, the roller bumper 14 is made of rubber. However, it should be appreciated that the roller bumper 14 can be made of any suitable material.

It should also be appreciated that the roller bumper 14 may instead be a rolling gear profile that engages with a gear/cam profile on the actuating lever 7 to act as a decelerator. It should be appreciated also that the roller bumper 14 may instead be replaced with any number of profiles that interface with any number of profiles of the actuating lever 7 to act as a decelerator. It should be appreciated also that the rolling-element-deceleration portion of the design of the dampener may be used independently of the two-pin deceleration of the design. It should be appreciated also that the two-pin-deceleration portion of the design may be used independently of the rolling element of the design.

While the invention has been disclosed in detail in connection with only a limited number of exemplary embodiments, it should be readily understood that the invention is not limited to such embodiments. Rather, the invention can be modified to incorporate any number of variations, alterations, substitutions, or equivalent arrangements not heretofore disclosed, but that are commensurate with the spirit and scope of the invention. Additionally, while various exemplary embodiments of the invention have been disclosed, it is to be understood that aspects of the invention may include only some of these embodiments. Accordingly, the invention is not to be seen as limited by the foregoing disclosure.

Having thus described the invention, it is claimed:

1. A dampener assembly for a lever comprising:
   a travel limiter that defines a surface for co-acting with the dampener, the lever configured to move from a locked position to an unlocked position to unlock a component for adjustable;
   a roller bumper; and
   a cam assembly that is configured to cause the surface of the travel limiter to contact the roller bumper in the unlocked position, the dampener further comprises a stop located on the lever and, as the lever reaches the unlocked position, the roller bumper contacting the stop in the unlocked position.

2. The dampener of claim 1, wherein the component is either of a rake-telescope steering column and an adjustment assembly therefor.

3. A dampener assembly for a lever comprising:
a travel limiter that defines a surface for co-acting with the dampener, the lever configured to move from a locked position to an unlocked position to unlock a component for adjustable;
a roller bumper; and
a cam assembly that is configured to cause the surface of the travel limiter to contact the roller bumper in the unlocked position, and as the lever reaches the unlocked position, the roller bumper does not stop and continues to rotate and the cam assembly begins to engage the travel limiter.

4. The dampener of claim 3, wherein the dampener assembly further comprises a plurality of pins each of which is configured to contact a surface of the cam assembly, facilitating rotation of the pin about the surface.

5. The dampener of claim 4, wherein the pin contacts a respective point of a top of a pocket of the travel limiter.

6. The dampener of claim 4, wherein the pin contact allows, with an overload or excessive unlock rotational speed, a slight over-travel motion of the lever that begins to re-clamp the component, which decelerates the lever less abruptly and softens the unlocked engagement of the lever.

7. A lever configured to move from a locked position to an unlocked position to unlock and adjust a component, the lever comprising:
a travel limiter;
a roller bumper; and
a cam assembly configured to cause a surface of the travel limiter to contact the roller bumper in the unlocked position, and the lever further comprises a stop configured to contact the roller bumper in the unlocked position.

8. The lever of claim 7, wherein the component is either of a rake-telescope steering column and an adjustment assembly for a rake-telescope steering column.

9. A lever configured to move from a locked position to an unlocked position to unlock and adjust a component, the lever comprising:
a travel limiter;
a roller bumper; and
a cam assembly configured to cause a surface of the travel limiter to contact the roller bumper in the unlocked position, and as the lever reaches the unlocked position, the roller bumper is configured to continue to rotate and the cam assembly begins to engage the travel limiter.

10. The lever of claim 9, wherein the lever further comprises a plurality of pins each of which is configured to contact a surface of the cam assembly, facilitating rotation of the pin about the surface.

11. The lever of claim 10, wherein the pin contact with the cam assembly facilitates, with an overload or excessive unlock rotational speed, a slight over-travel motion of the lever that begins to re-clamp the component, which decelerates the lever and softens the unlocked engagement of the lever.

12. A rake-telescope steering column comprising:
an adjustment assembly that includes a lever configured to move from a locked position to an unlocked position to unlock and adjust the steering column, the lever comprising:
a travel limiter;
a roller bumper; and
a cam assembly configured to cause a surface of the travel limiter to contact the roller bumper in the unlocked position, and the lever includes further a stop configured to contact the roller bumper in the unlocked position.

13. The steering column of claim 12, wherein, as the lever reaches the unlocked position, the roller bumper is configured to continue to rotate and the cam assembly begins to engage the travel limiter.

14. The steering column of claim 13, wherein the lever further comprises a plurality of pins each of which is configured to contact a surface of the cam assembly, facilitating rotation of the pin about the surface.

15. The steering column of claim 14, wherein the pin contact with the cam assembly facilitates, with an overload or excessive unlock rotational speed, a slight over-travel motion of the lever that begins to re-clamp the steering column, which decelerates the lever and softens the unlocked engagement of the lever.

* * * * *